Patented Jan. 13, 1925.

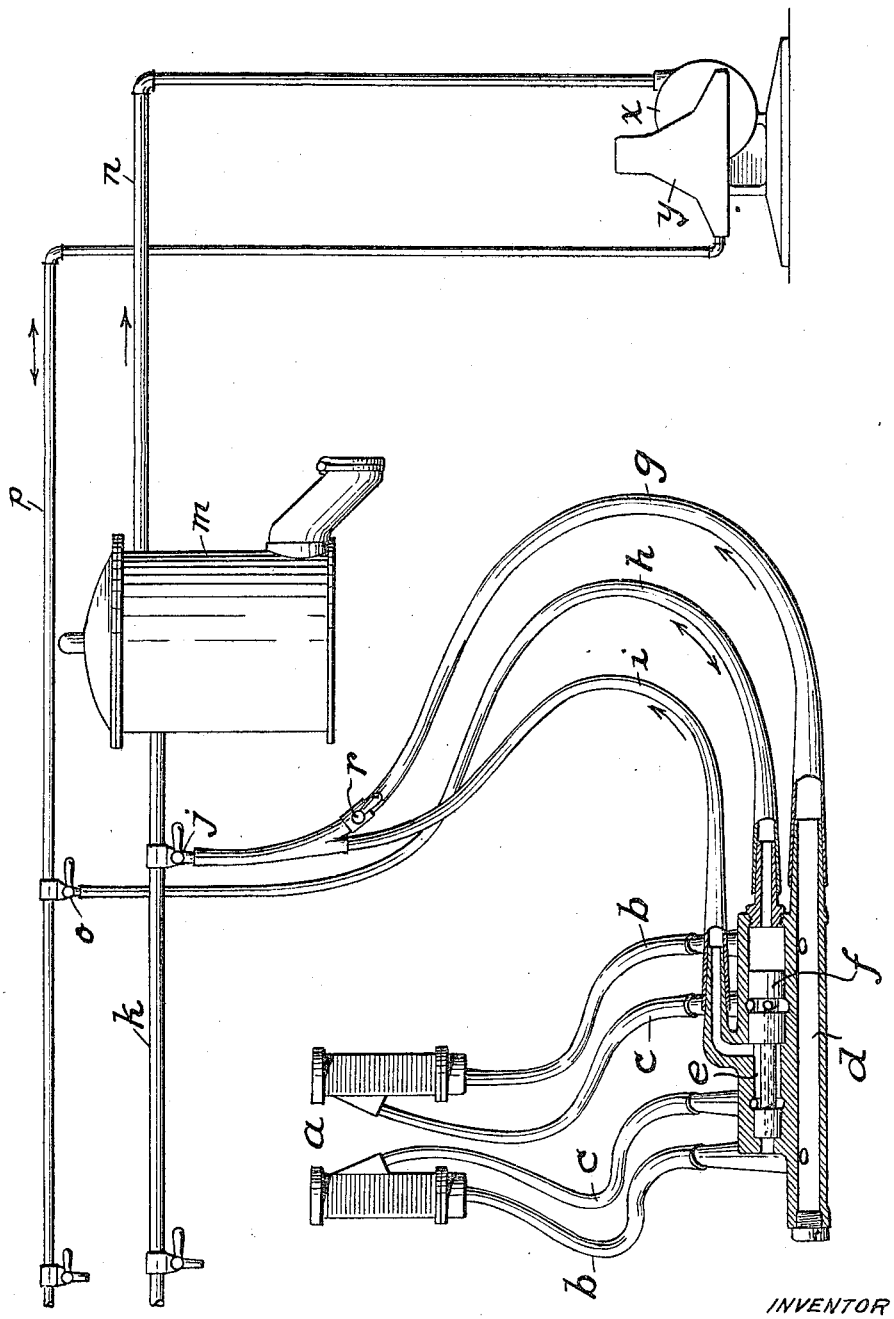

1,522,680

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

MILKING MACHINE.

Application filed December 3, 1923. Serial No. 678,092.

*To all whom it may concern:*

Be it known that I, CYRUS HOWARD HAPGOOD, a citizen of the United States, residing at Nutley, county of Essex, and State of New Jersey, have invented a new and useful Improvement in Milking Machines, of which the following is a full, clear, and exact description, reference being had to the accompanying drawings, which form a part of this specification.

The object of my invention is to provide a cow milker operating on the master pulsator system and the releaser system wherein all leakages of milk from the milk line into the udder pulsator will be prevented.

A known type of such a system comprises a set of double chambered teat cups; a claw comprising a valve chamber and a milk chamber, the milk chamber being connected with the inner or teat chambers of the cups and the valve chamber with the outer or pulsation chambers of the cups; a milk and vacuum pipe line extending to the releaser; a vacuum line extending from the releaser to a vacuum pump; a pulsation pipe line extending to a master pulsator; a flexible pulsation tube from the valve chamber detachably connected with the pulsation pipe line; and a flexible milk tube from the milk chamber detachably connected with the milk and vacuum pipe line. Cocks are provided at the junction of the two pipe lines with the respective tubes. Pulsations transmitted from the master pulsator are conveyed through the pulsation pipe line and the tube connected therewith to the valve chamber, and the udder pulsator valve therein reciprocates in response to said pulsations and alternately admits air to and exhaust air from the pulsation chambers of the teat cups. Air is admitted to the pulsation chambers of the teat cups through an atmospheric port in the valve chamber. Air exhausts from the pulsation chambers of the teat cups into the valve chamber and thence into the milk chamber, which is under constant suction during milking.

After a cow is milked, the cock at the junction of the milk and vacuum pipe line and the milk tube is closed. Thereby suction on the teats is cut off and the cups are removed. This milk cock is again opened to establish suction in the teat chambers of the cups preparatory to applying them to the next cow to be milked. While this cock remains closed, the milk which remains in the milk tube will flow by gravity back into the milk chamber of the claw, which communicates with an end port in the udder pulsator. In case the cock at the junction of the pulsation pipe line and the pulsation tube is left open, which it always is in practice, there is a slight leakage past the pistons of the udder pulsator valve, which causes an intermittent vacuum, thus pulling the milk from the milk tube and milk chamber into the udder pulsator. Occasionally, the milk even works into the chamber between the shell of the teat cup and the rubber liner (the pulsation chamber of the teat cup).

A modification of the above described construction comprises a three tube system, partly disclosed in the Leitch Patent No. 1,255,186, dated February 5, 1918. In this system, there is no direct communication between the milk chamber and valve chamber of the claw. Instead, a third (vacuum) tube is connected to this valve chamber and provides an exhaust (through the valve chamber) from the pulsation chambers of the teat cups. This tube extends to the milk tube near its junction with the milk and vacuum pipe line and is therefore under constant suction during milking. In this system, too, when the cock at the junction of the milk and vacuum pipe line and the milk tube is closed (thus cutting off the vacuum from the vacuum tube), the milk remaining in the milk tube above this connection to the vacuum tube will flow partly down through the vacuum tube into the udder pulsator. The intermittent vacuum created in the pulsation tube will pull the milk from the milk tube through the vacuum tube into the udder pulsator. That this must occur will be apparent from the fact that, when the teat cups are removed from the cow, the milk tube is at atmospheric pressure.

I have succeeded in providing an arrangement whereby all leakages of milk into the udder pulsator, during the interval between milkings, will be avoided. In the specific embodiment of my invention herein shown, the system involves the use of three pipes, but with the provision of a special valve which, between milkings, is operated in place of the valve at the junction of the milk and vacuum pipe and the milk tube.

The drawing is an illustration, partly diagrammatic, of a milking machine embodying my invention.

*a* represents two of a set of four double chambered teat cups, the inner or teat chambers of which are connected by means of tubes *b, b* with the milk chamber *d* of the claw, and the outer or pulsation chambers of which are connected through tubes *c, c* with the udder pulsator valve chamber *e* of the claw. Within the valve chamber *e* is a valve *f*. From the milk chamber *d* of the claw extends a flexible tube *g*. From one end of the valve chamber extends a flexible tube *h*. Communicating with a port in the central part of the valve chamber is a third flexible tube *i*. The other end of the valve chamber is open to atmosphere. If tubes *g* and *i* are connected with a source of suction and tube *h* with a source of pneumatic pulsations, the valve *e* will reciprocate and connect the outer teat cup chambers alternately with atmosphere and suction, while milk will be drawn from the inner teat cup chambers into the milk chamber *d* of the claw. The above construction is old and well known, the structure and operation being fully set forth in the Leitch Patent No. 1,255,186, dated February 5, 1918.

When the above described milking machine unit is used in connection with the releaser system of milking, the milk tube *g* is arranged for connection with a nozzle, controlled by a cock *j*, on a milk and vacuum pipe line *k* connected with a releaser *m*. The releaser *m* is connected by a vacuum pipe *n* with a vacuum pump *x*. The releaser may be of any known construction and therefore need not be particularly described. The tube *h* is connected with a nozzle, controlled by cock *o*, on a pulsation pipe line *p*, which is connected with a master pulsator valve *y* that operates to connect pipe *p* alternately with atmosphere and with the vacuum pump *x*. An entirely satisfactory vacuum pump is set forth in the Leitch Patent No. 1,367,554, dated February 8, 1921, and the Hall Patent No. 1,374,650, dated April 12, 1921, while the Leitch Patent No. 1,378,881, dated May 24, 1921, shows a practicable type of master pulsator associated with such a pump.

In the present invention, with the use of a releaser system, the tube *i* is connected with the tube *g*, whereby the central part of the pulsation valve chamber of the claw is in constant connection with vacuum. Thereby the teat cups, the udder pulsator, and the three described flexible tubes extending from the latter, form a self-contained milking machine unit that may be applied to the main milk and vacuum pipe line and the main pulsation pipe line at any point along the length of the same where cock-controlled nozzles are provided.

The described construction is entirely operative, but is open to certain objections (hereinbefore described) which the present invention aims to overcome. After a cow is milked, cock *j* is closed in order to shut off the vacuum from the teat cups and permit them to be released. Cock *o* remains open. To enable the cups to be applied to the next cow, cock *j* is again opened. Between the closing of cock *j* to permit the removal of the cups from one cow and its re-opening to permit the application of the cups to another cow, part of the milk that remains in the milk tube *g*, between the milk and vacuum pipe line *k* and the connection between tube *g* and tube *i* will flow by gravity down pipe *i* and into the udder pulsator. If cock *o* is allowed to remain open, which it usually is, an intermittent vacuum is created in the valve chamber *d*, which (bearing in mind that tubes *g* and *i* are now at atmospheric pressure) will pull milk into the pulsator. Occasionally, the milk works up into the chamber between the shell of a teat cup and the rubber liner.

To prevent the objectionable condition just described, I apply a valve *r* to the tube *g* just below the latter's junction with the tube *i*. This valve is open during milking. Instead of closing the cock *j* after a cow is milked and preparatory to the removal of the teat cups, I close the valve *r*. The closing of valve *r* shuts off the vacuum as effectively as the closing of valve *j*, and the cups may be removed from the cow. However, the valve *j* being open, the tube *i* continues to be in communication with the main milk and vacuum pipe line *k*, which is under constant suction. Therefore, no milk will flow down through tube *i*. When it is desired to apply the cups to another cow, valve *r* is again opened.

The described construction involves no complication in the operation, because all that is necessary, in order to transfer a set of cups from one cow to another, is to first close, and then open, a single cock (*r*). The operator can operate this cock with more ease than a cock, such as *j*, located on the pipe line, because cock *r* is within easy reach from the teat cups; whereas to operate cock *j*, the operator would have to stand up and move several feet. It will be understood, however, that the convenient location of cock *r* is an incidental minor advantage, the major advantage being that the additional cock *r*, located as described, prevents access of milk to the udder pulsator.

Having now fully described my invention, what I claim and desire to protect by Letters Patent is:

1. In a milking machine, the combination with a set of double chambered teat cups, of a source of suction and connections therefrom to transmit suction to, and convey milk from, the inner teat cup chamber; said connections comprising a releaser, a milk and vacuum pipe line, a milk tube, and tubular connections to the inner teat cup chambers; an udder pulsator, connections from the pulsator to the outer teat cup chambers, means to transmit pulsations to the pulsator, a vacuum tube connecting the pulsator with said suction-transmitting connections and through which air is exhausted from the outer teat cup chambers, and a valve adapted to release the suction in the inner teat cup chambers while maintaining suction in said vacuum tube.

2. In a milking machine, the combination with a set of double chambered teat cups, of a milk and vacuum pipe line, means, including a milk tube, connecting said pipe line with the inner teat cup chambers, an udder pulsator having a vacuum port, connections from the pulsator to the outer teat cup chambers, means to transmit pneumatic pulsations to the pulsator, a vacuum tube connecting said vacuum port with the milk tube, and a valve in the connecting means from the milk and vacuum tube to the inner teat cup chambers, said valve being located beyond the junction of the vacuum tube with the milk tube, whereby, when said valve is closed to cut off suction to the inner teat cup chambers, the vacuum tube will remain under suction and backflow of milk therethrough from the milk tube into the pulsator will be prevented.

In testimony of which invention, I have hereunto set my hand, at New York, on this 30th day of November, 1923.

CYRUS HOWARD HAPGOOD.

Witnesses:
R. R. WARREN,
G. D. TALLMAN.